United States Patent
Lu et al.

(10) Patent No.: US 11,247,123 B2
(45) Date of Patent: Feb. 15, 2022

(54) GAME CONTROLLER

(71) Applicant: DEXIN CORPORATION, New Taipei (TW)

(72) Inventors: Ho-Lung Lu, New Taipei (TW); Chin-Lung Lin, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 0 days.

(21) Appl. No.: 17/033,937

(22) Filed: Sep. 28, 2020

(65) Prior Publication Data

US 2021/0370164 A1 Dec. 2, 2021

(30) Foreign Application Priority Data

May 29, 2020 (TW) .................................. 109117969

(51) Int. Cl.
*A63F 13/24* (2014.01)
*A63F 13/235* (2014.01)
*A63F 13/92* (2014.01)
*A63F 13/98* (2014.01)

(52) U.S. Cl.
CPC ............ *A63F 13/24* (2014.09); *A63F 13/235* (2014.09); *A63F 13/92* (2014.09); *A63F 13/98* (2014.09); *A63F 2300/1025* (2013.01)

(58) Field of Classification Search
None
See application file for complete search history.

(56) References Cited

U.S. PATENT DOCUMENTS

| | | | |
|---|---|---|---|
| 9,081,545 B1* | 7/2015 | Lin .......................... | A63F 13/98 |
| 2006/0252537 A1* | 11/2006 | Wu .......................... | A63F 13/02 463/36 |
| 2007/0021210 A1* | 1/2007 | Tachibana ............. | A63F 13/211 463/37 |
| 2013/0095925 A1* | 4/2013 | Xu .......................... | G06F 1/169 463/37 |
| 2013/0267322 A1* | 10/2013 | South ...................... | A63F 13/92 463/38 |
| 2014/0228075 A1* | 8/2014 | Baschnagel ............. | H04M 1/04 455/557 |
| 2014/0274208 A1* | 9/2014 | Baschnagel ............. | H04M 1/04 455/557 |
| 2014/0274394 A1* | 9/2014 | Willis ................... | G06F 1/1656 463/37 |
| 2018/0353850 A1* | 12/2018 | Strahle .................... | A63F 13/98 |
| 2018/0375977 A1* | 12/2018 | Deng ...................... | A63F 13/26 |
| 2020/0028291 A1* | 1/2020 | Lee ....................... | H01R 12/722 |
| 2020/0353351 A1* | 11/2020 | Mao ........................ | A63F 13/92 |

* cited by examiner

*Primary Examiner* — Tramar Harper
(74) *Attorney, Agent, or Firm* — Li & Cai Intellectual Property Office (57) ABSTRACT

A game controller is provided. The game controller includes a first handheld body and a first support unit. The first handheld body includes a first operation interface and a first connection portion. The first operation interface is electrically connected to the first connection portion. The first support unit is pivotally connected to a side of the first handheld body. The first support unit is foldably disposed on a side of the first handheld body. When the first support unit is in an unfolded state, a mobile device is fixedly disposed between the first support unit and the first handheld body.

16 Claims, 8 Drawing Sheets

GAME CONTROLLER

CROSS-REFERENCE TO RELATED PATENT APPLICATION

This application claims the benefit of priority to Taiwan Patent Application No. 109117969, filed on May 29, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a game controller, and more particularly to a game controller that is convenient to store and carry.

BACKGROUND OF THE DISCLOSURE

Due to the popularity of mobile devices, smart phones or tablet computers have gradually become the main developing platforms for various games. Due to a smooth design of the smart phone, when a user holds the smart phone for a long period of time, the long gripping experience of the smart phone is fairly uncomfortable. In addition, game controllers usually do not have a corresponding design for supporting mobile devices with different sizes.

In addition, current designs of the game controller, such as those in patent applications CN108568106A, CN104014126A, TW201833884A, TW201716122A, TW201722517A, and US patents U.S. Pat. Nos. 9,757,649, 9,808,713, 9,855,498 are all in an integrated U-shaped structure to support mobile devices having a fixed size. In addition, as disclosed in the patent TWI647679B and the U.S. Pat. No. 9,126,119, the size of a structure of two game controllers is able to be fixed and adjusted by implementing a crossbar on the back thereof. Although the game controllers of the above patents or patent applications include structures for supporting the mobile devices, their designs are not only bulky and unsuitable for being carried along, but also cause problems in use.

Therefore, it has become an important issue to provide a game controller that is convenient to store and carry and has a support structure for a mobile device.

SUMMARY OF THE DISCLOSURE

In response to the above-referenced technical inadequacies, the present disclosure provides a game controller. The game controller includes a first handheld body and a first support unit. The first handheld body includes a first operation interface and a first connection portion. The first operation interface is electrically connected to the first connection portion. The first support unit is pivotally connected to a side of the first handheld body. The first support is foldably disposed on a side of the first handheld body. When the first support unit is in an unfolded state, a mobile device is fixedly disposed between the first support unit and the first handheld body.

One of the beneficial effects of the present disclosure is that the game controller of the present disclosure can use a single-sided handheld body or two handheld bodies at the same time to jointly support the mobile device. The game controller of the present disclosure is not only convenient to carry and easier to use, but also includes a support unit to support the mobile device. Furthermore, the game controller of the present disclosure can use the two handheld bodies after being combined, which further improves the user experience in selecting games to play or making use of other control actions.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way.

Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 1:
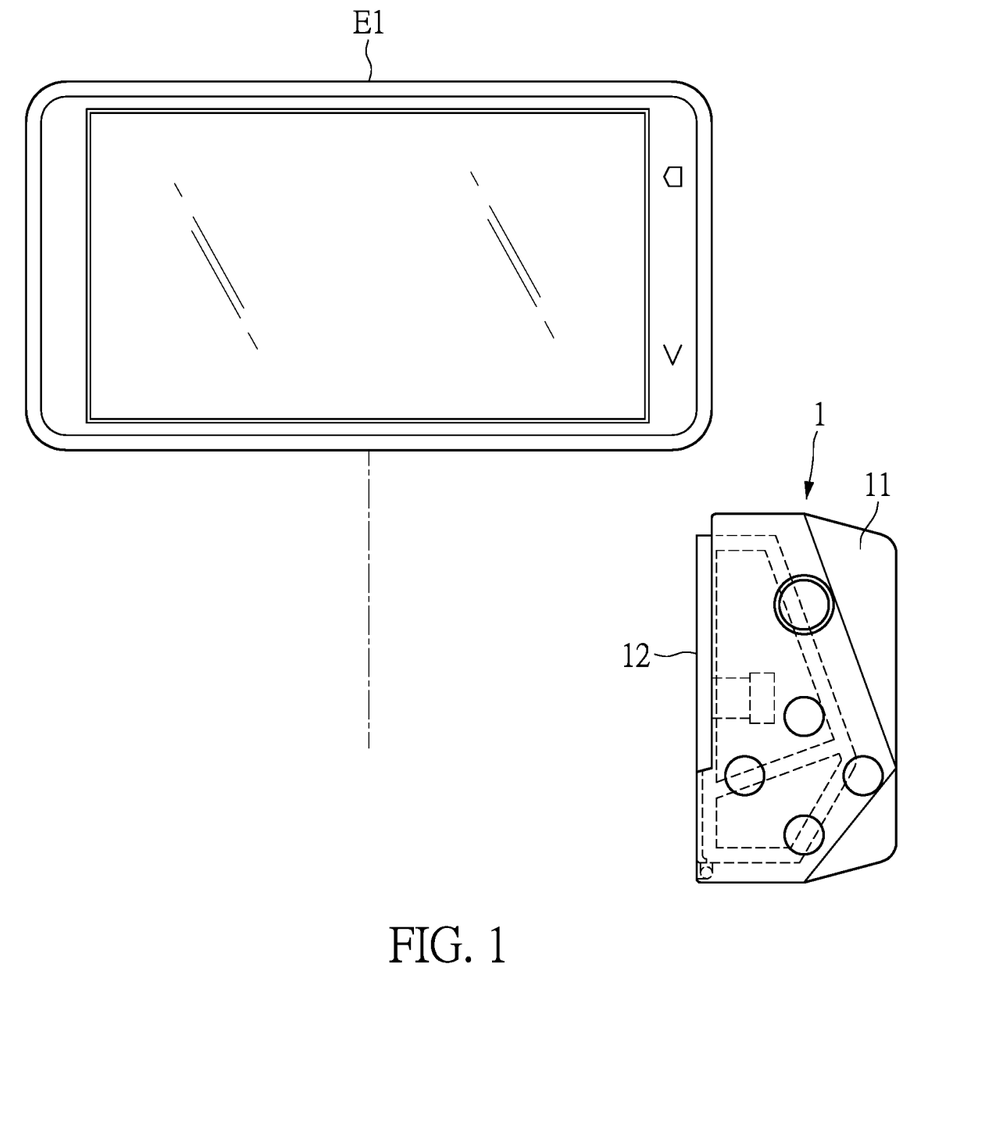
FIG. 1 is a schematic view of a game controller of a first embodiment of the present disclosure.
Figure 2:
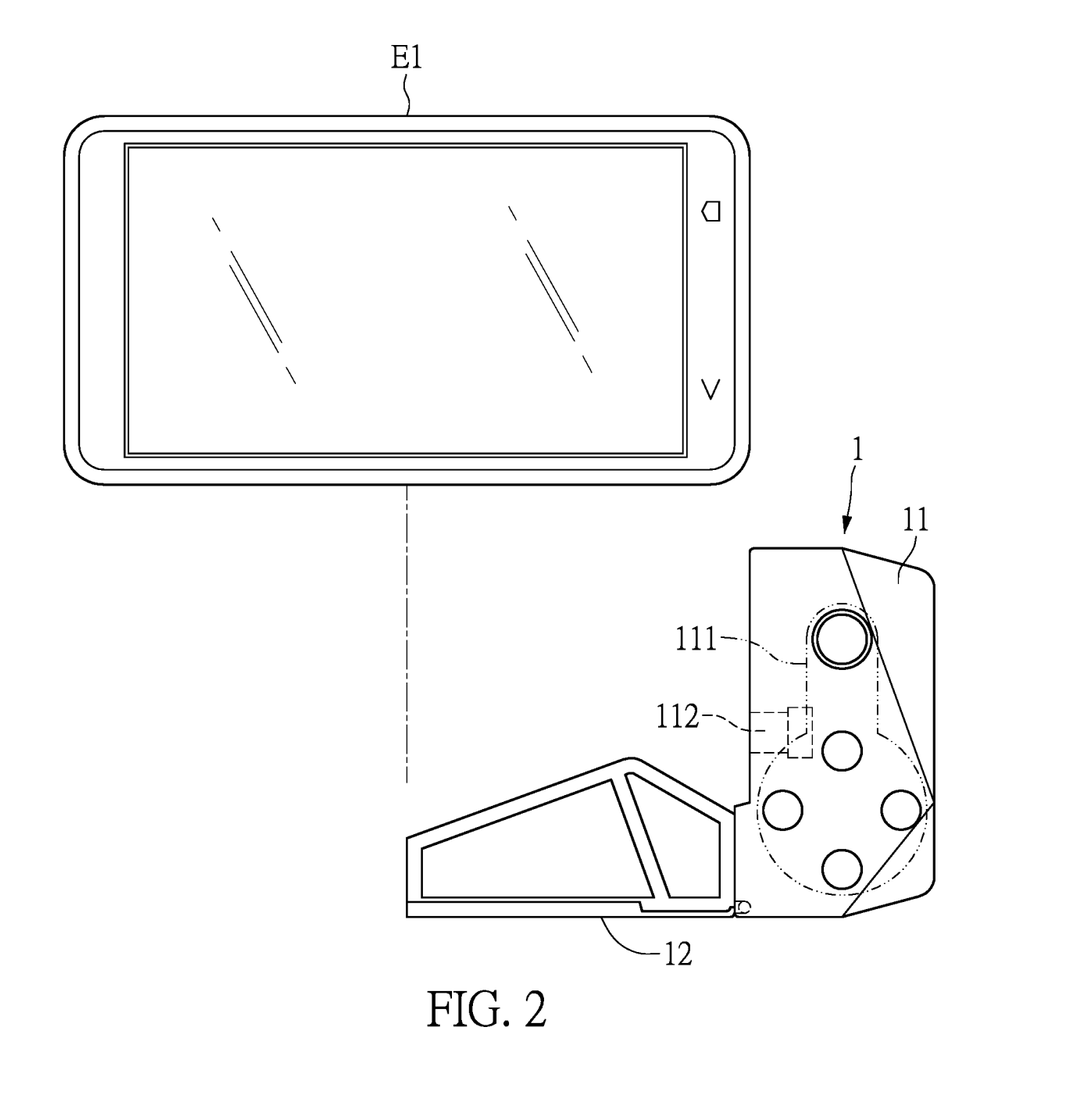
FIG. 2 is a schematic view of the game controller supporting a mobile device of the first embodiment of the present disclosure.
Figure 3:
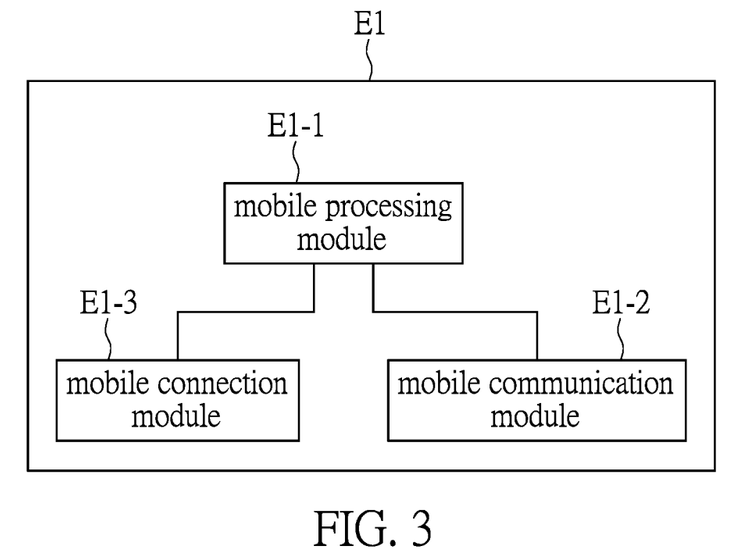
FIG. 3 is a functional block diagram of the mobile device of the present disclosure.
Figure 4:
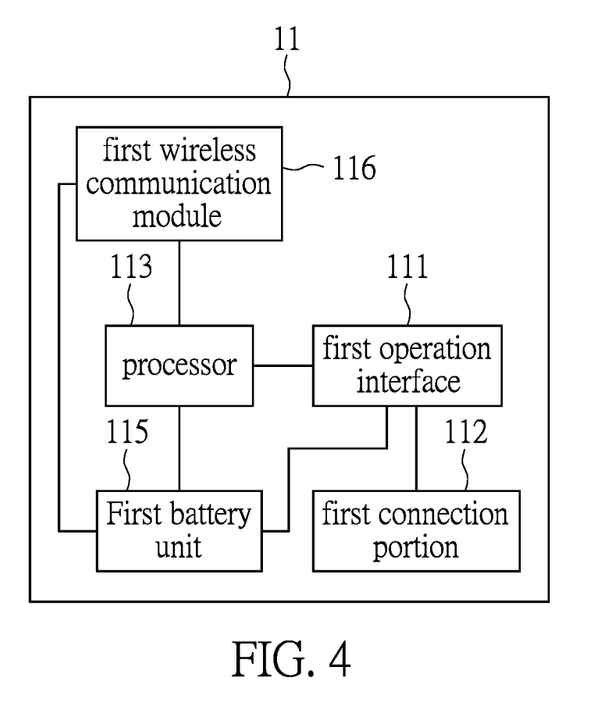
FIG. 4 is a functional block diagram of a first handheld body.

Referring to FIG. 1, FIG. 2, FIG. 3 and FIG. 4, FIG. 1 is a schematic view of a game controller of a first embodiment of the present disclosure. FIG. 2 is a schematic view showing that the game controller of the first embodiment of the present disclosure supports a mobile device. FIG. 3 is a functional block diagram of the mobile device of the present disclosure. FIG. 4 is a functional block diagram of the first handheld body.

In the present embodiment, the game controller 1 includes a first handheld body 11 and a first support unit 12. The first support unit 12 is pivotally disposed on a side of the first handheld body 11. In other words, the first support unit 12 is capable of being foldably disposed on the side of the first handheld body 11. When the first support unit 12 is in an unfolded state, the first support unit 12 is perpendicularly disposed on the first handheld body 11. A first angle between the first support unit 12 and the first handheld body 11 is about 90 degrees.

The first handheld body 11 includes a first operation interface 111 and a first connection portion 112. The first operation interface 111 is electrically connected to the first connection portion 112. The first operation interface 111 includes a button, joystick, or a touch screen.

Referring to FIG. 2, when the first support unit 12 is in the unfolded state, a mobile device E1 is fixedly disposed between the first support unit 12 and the first handheld body 11. Since the first angle is between the first handheld body 11 and the first support unit 12, the first handheld body 11 and the first support unit 12 has an accommodation space therebetween. Therefore, the mobile device E1 is fixedly disposed between the first handheld body 11 and the first support unit 12.

The mobile device E1 is a smart phone, a tablet computer, or a wearable electronic device. The mobile device E1 includes a mobile processing module E1-1, a mobile communication module E1-2, and a mobile connection module E1-3. The mobile processing module E1-1 is electrically connected to the mobile communication module E1-2 and the mobile connection module E1-3. The mobile device E1 is connected to a peripheral device or a power supply through the mobile connection module E1-3.

In the present embodiment, the mobile device E1 is connected to the first connection portion 112 of the first handheld body 11 through the mobile connection module E1-2. When the mobile device E1 is fixedly disposed between the first support unit 12 and the first handheld body 11, the mobile device E1 is connected to the first connection portion 112 of the first handheld body 11. Furthermore, when the first connection portion 112 of the first handheld body 11 is electrically connected to the mobile connection module E1-3 of the mobile device E1, a plurality of control signals of the first operation interface 111 of the first handheld body 11 are transmitted to the mobile device E1 for action control(s). The first connection portion 112 is a lightning connector, a micro-USB connector, a type-A USB connector, or a type-C USB connector.

In the present embodiment, the first connection portion 112 is immovably fixed on the first handheld body 11. In other words, the first connection portion 112 cannot be detached from the first handheld body 11.

In other embodiments, the first connection portion 112 is detachably disposed on the first handheld body 11. The first connection portion 112 is replaceable. The first connection portion 112 is disposed on the first handheld body 11 in a magnetic manner or in a mechanism fixing manner. In addition, since the first connection portion 112 is detachable and replaceable, a user can replace the first connection portion 112 with another connector based on the mobile connection module E1-3 of the mobile device E1.

The first handheld body further includes a first wireless communication module 116. The first wireless communication module 116 is electrically connected to the first operation interface 111 and a processor 113. The first wireless communication module 116 is in communication with the mobile communication module E1-2 of the mobile device E1. Furthermore, when the first wireless communication module 116 of the first handheld body 11 is in communication with the mobile communication module E1-2 of the mobile device E1, the control signals of the first operation interface 111 of the first handheld body 11 are transmitted to the mobile device E1 to execute control actions.

Second Embodiment

Figure 5:
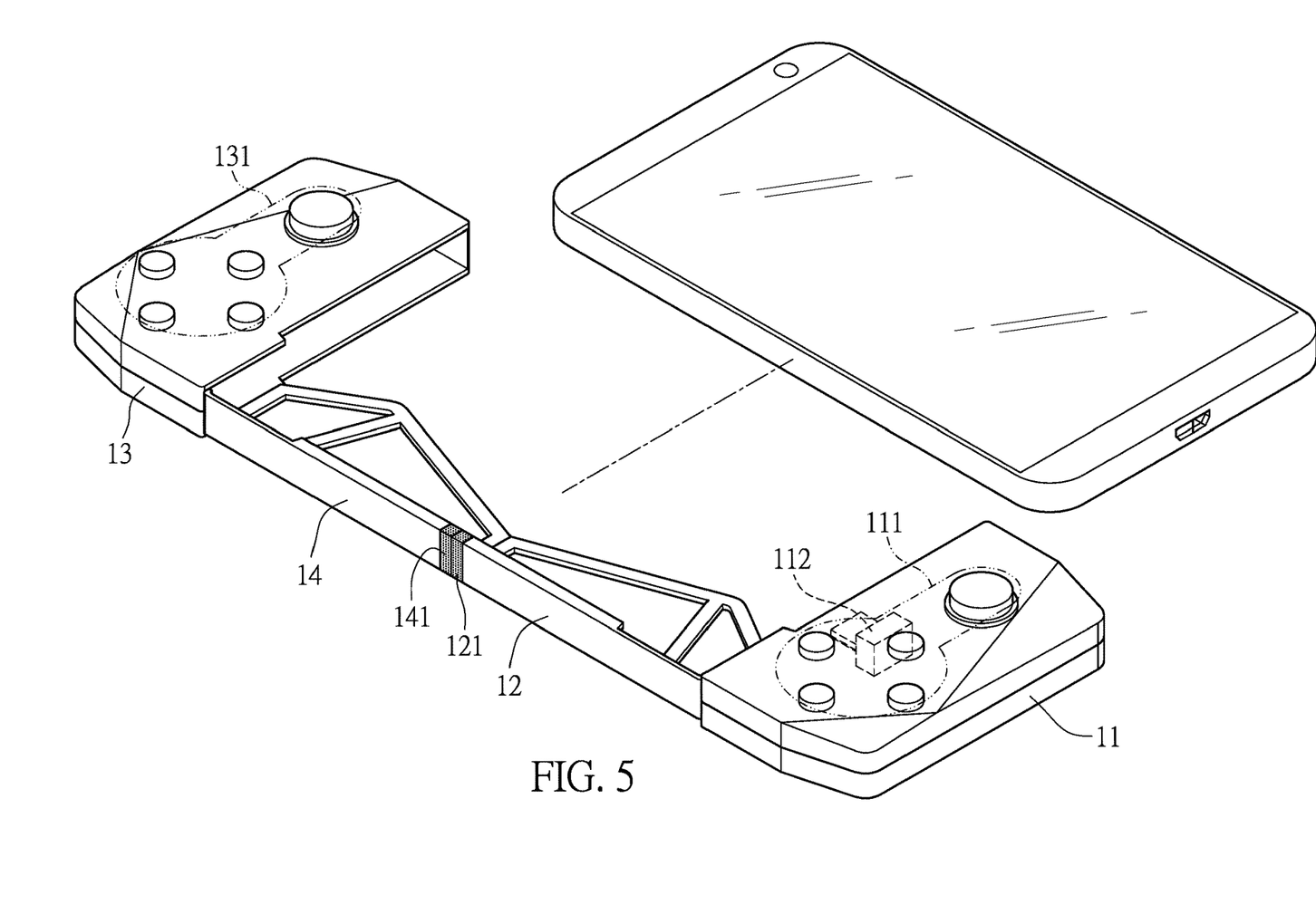
FIG. 5 is a schematic view of a game controller of a second embodiment of the present disclosure.
Figure 6:
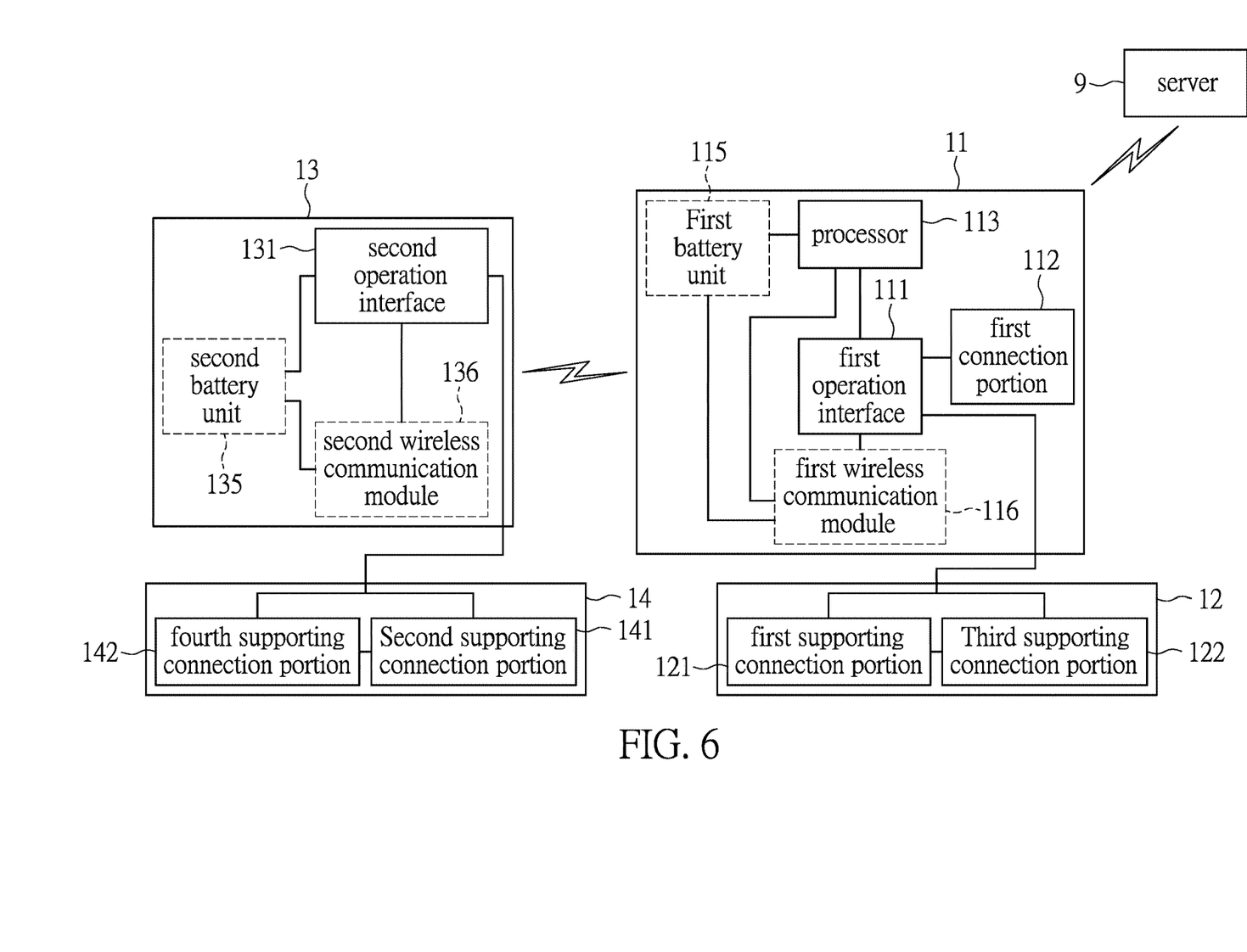
FIG. 6 is a functional block diagram of the game controller of the second embodiment of the present disclosure.
Figure 7:
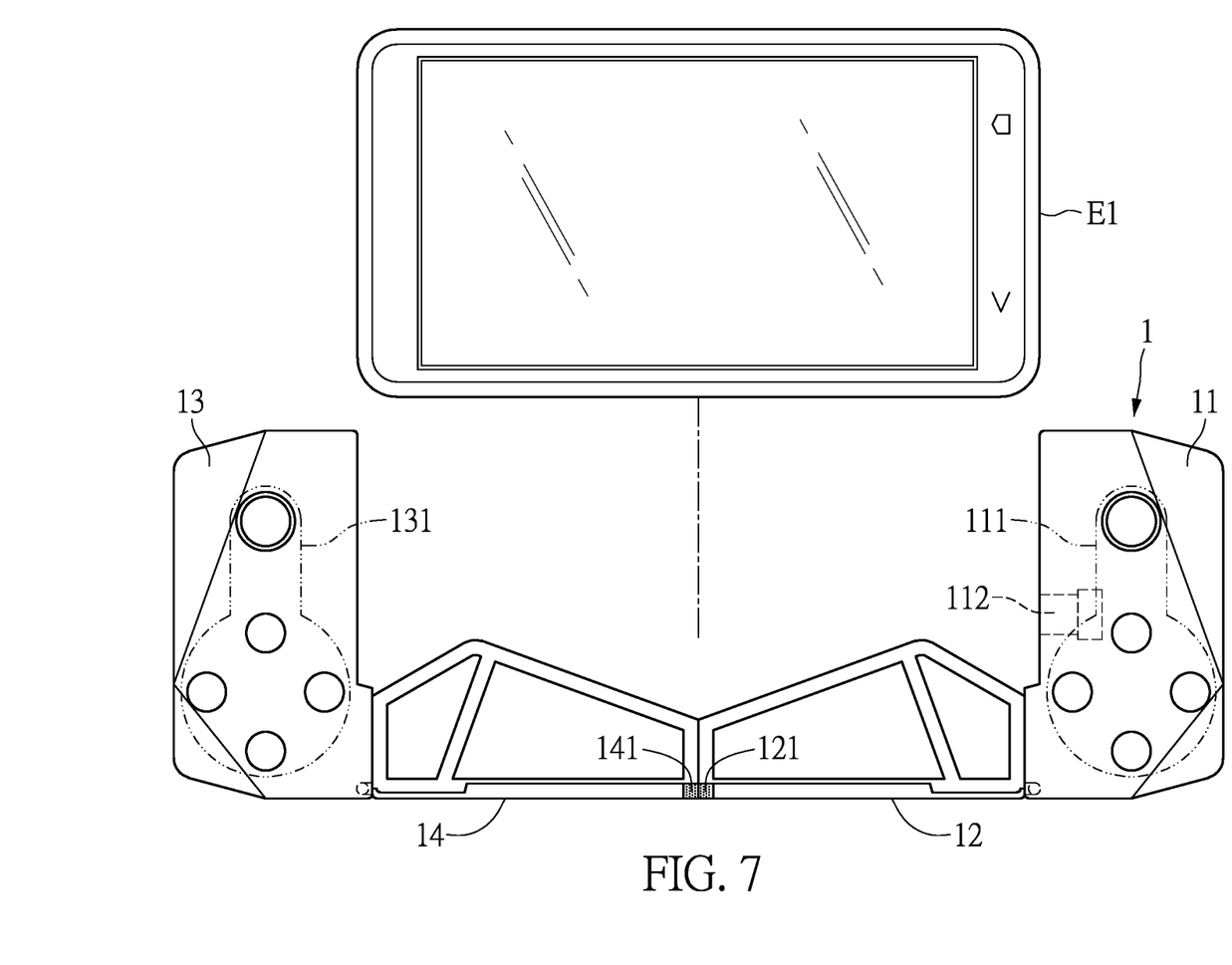
FIG. 7 is a schematic view of the game controller supporting a mobile device of the second embodiment of the present disclosure.
Figure 8:
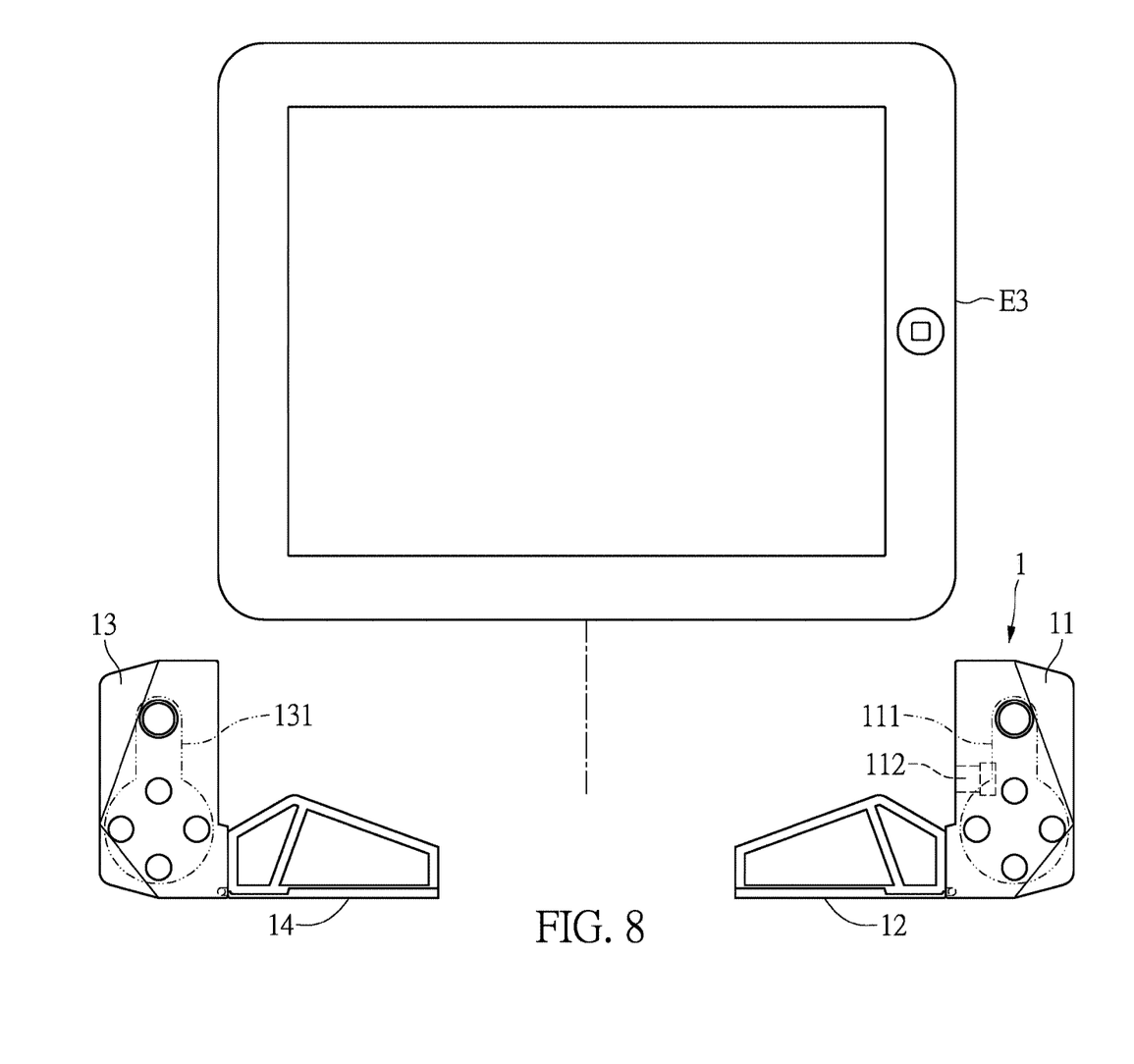
FIG. 8 is another schematic view of the game controller supporting the mobile device of the second embodiment of the present disclosure.

Referring to FIG. 5, FIG. 6, FIG. 7 and FIG. 8, FIG. 5 is a schematic view of a game controller of a second embodiment of the present disclosure. FIG. 6 is a functional block diagram of the game controller of the second embodiment of the present disclosure. FIG. 7 is a schematic view showing that the game controller of the second embodiment of the present disclosure supports the mobile device. FIG. 8 is another schematic view showing that the game controller supports of the second embodiment of the present disclosure the mobile device.

The game controller 1 further includes a second handheld body 13 and a second support unit 14. The second handheld body 13 includes a second operation interface 131. The second support unit 14 is pivotally disposed on a side of the second handheld body 13. The second support unit 14 is foldably disposed on the side of the second handheld body 13.

The first handheld body 11, the first support unit 12, the second handheld body 13, and the second support unit 14 can be used separately or in conjunction with each other.

The first handheld body 11 and the second handheld body 13 can adjust the communication configuration of being in wired communication or in wireless communication based on requirements. Therefore, the first handheld body 11 and the second handheld body 13 can include battery units and wireless communication modules at the same time. In other words, in FIG. 5, the connection portions, the battery units, and the wireless communication modules of the first handheld body 11 and the second handheld body 13 can be optionally disposed.

As shown in FIG. 7, when the first support unit 12 and the second support 14 are in an unfolded state, the mobile device E1 is fixedly disposed between the first handheld body 11, the first support unit 12, the second handheld body 13, and the second support unit 14. In the present embodiment, a side of the mobile device E1 is supported by the first support unit 12 and the second support unit 14. Two opposite sides of the mobile device E1 are supported by the first handheld body 11 and the second handheld body 13, respectively.

The first handheld body 11 further includes a first battery unit 115 and a first wireless communication module 116. The first battery unit 115 is electrically connected to the first wireless communication module 116 and the first operation interface 111. The second handheld body 13 further includes a second battery unit 135 and a second wireless communication module 136. The second battery unit 135 is electrically connected to the second wireless communication module 136 and the second operation interface 131. The first handheld body 11 is in communication with the second handheld body 13 through the first wireless communication module 116 and the second wireless communication module 136.

In other words, a plurality of control signals of the second operation interface 131 of the second handheld body 13 are transmitted to the first wireless communication module 116, and then the control signals of the second operation interface 131 are transmitted to the mobile device E1 to execute corresponding control actions.

In addition, the first handheld body 11 and the second handheld body 13 can additionally include a storage module (not shown in figures) to store setting values of the first operation interface 111 and the second operation interface 131, respectively.

The processor 113 is a central processing unit (CPU), an application specific integrated circuit (ASIC), or a micro control unit (MCU).

The storage module (not shown in figures) is a flash memory, a read-only memory, a programmable read-only memory, an electrically rewriteable read-only memory, an erasable and programmable read-only memory, or an electronically erasable programmable read-only memory.

The first handheld body 11 and the second handheld body 13 are communicatively connected to a server 9 through the first wireless communication module 116 and the second wireless communication module 13 to receive control signals of the server 9 or data from a database (not shown in figures) of the server 9, or transmit the control signals to the server 9. In addition, the first handheld body 11 and the second handheld body 13 can further include a wired communication module. The wired communication modules (not shown in figures) of the first handheld body 11 and the second handheld body 13 can be communicatively connected to the server 9 to receive the control signals of the server 9 or data from the database (not shown in figures) of the server 9, or transmit the control signals to the server 9. The first wireless communication module 116 and the second wireless communication module 136 can be a Wi-Fi communication unit, a Bluetooth® communication unit, a Zigbee® communication unit, a LoRa communication unit, a Sigfox communication unit, or an NB-IoT communication unit.

The mobile communication module E1-2 includes a wired communication unit (not shown in figures) and a wireless communication unit (not shown in figures). The wired communication unit (not shown in figures) can be independently implemented. When the mobile communication module E2-2 is the wireless communication unit, the mobile communication unit E2-2 can be a Wi-Fi communication unit, a Bluetooth® communication unit, a Zigbee® communication unit, a LoRa communication unit, a Sigfox communication unit, or an NB-IoT communication unit. The first battery unit 115 and the second battery unit 135 can be a lithium ion battery, a lithium manganese battery, a lithium polymer battery, or a nickel hydrogen battery, respectively.

In FIG. 6, the first handheld body 11 includes a processor 113 and a first battery unit 115. The first support unit 12 includes a first supporting connection portion 121. The second support unit 14 includes a second supporting connection portion 141. The processor 113 is electrically connected to the first battery unit 115 and the first supporting connection portion 121. In addition, the first operation interface 111 is electrically connected to the first supporting connection portion 121. The second operation interface 131 is electrically connected to the second supporting connection portion 141. When the mobile device E1 is fixedly disposed between the first handheld body 11, the first support unit 12, the second handheld body 13, and the second support unit 14, the first handheld body 11 is electrically connected to the second handheld body 13 through the first supporting portion 121 and the second supporting portion 141. In other words, electric power and signals of the first handheld body 11 and the second handheld body 13 can be bi-directionally transmitted through the first supporting connection portion 121 and the second supporting connection portion 141, respectively.

Since the first wireless communication module 116 and the second wireless communication module 136 are optionally disposed in the handheld bodies, a plurality of configurations of the wireless communication module of the present disclosure are described as follows.

In a first configuration, the first handheld body 11 or the second handheld body 13 can include a wireless communication module. The wireless communication module of the first handheld body 11 or the second handheld body 13 is in communication with the mobile device E1. The first handheld body 11 and the second handheld body 13 are in communication with each other by a wired communication. In other words, the first handheld body 11 is in communication with the second handheld body 13 by being connected to a second supporting connection portion 141 of the second support unit 14 through a first supporting connection portion 121 of the first support unit 12. In the present embodiment, the first handheld body 11 may include the first wireless communication module 116, and the second handheld body 13 may not include the wireless communication module. The first wireless communication module 116 of the first handheld body 11 is used as a main communication path to be communicatively connected to the mobile device E1. In addition, the first handheld body 11 is communicatively connected to the second handheld body 13 through the first supporting connection portion 121 and the second supporting connection portion 141 is connected in a wired communication manner. In other embodiments, the first handheld body 11 may not include the wireless communication module, and the second handheld body 13 includes the second wireless communication module 136. The second wireless communication module 136 is used as a major communication path to be communicatively connected to the mobile device E1. The first handheld body 11 is in communication with the second handheld body 13 through the first supporting connection portion 121 and the second supporting portion 141 is connected in a wired communication manner.

In a second configuration, the first handheld body 11 includes a first wireless communication module 116, and the second handheld body 13 includes a second wireless communication module 136. The first wireless communication module 116 is electrically connected to the first operation interface 111, and the second wireless communication module 136 is electrically connected to the second operation interface 131. In other words, the first handheld body 11 and the second handheld body 13 include a wireless communication module, respectively. The first wireless communication module 116 of the first handheld body 11 is communicatively connected to the second wireless communication module 136 of the second handheld body 13. In other words, one of the first wireless communication module 116 and the second wireless communication module 136 is used as a master wireless communication module, and another one of the first wireless communication module 116 and the second wireless communication module 136 is used as a slave wireless communication module. If the first wireless communication module 116 is used as the master wireless communication module and the second wireless communication module 136 is used as the slave wireless communication module, the control signals of the second operation interface 131 are transmitted to the first wireless communication module 116 through the second wireless communication 136, and then the control signals are transmitted to the mobile device E1 through the first wireless communication module 116. The control signals of the first operation interface 111 are directly transmitted to the mobile device E1 through the first wireless communication module 116. If the second wireless communication module 136 is used as the master wireless communication module and the first wireless communication module 116 is used as the slave wireless communication module, the control signals of the first operation interface 111 are transmitted to the second wireless communication module 136 through the first wireless communication module 116, and then the control signals are transmitted to the mobile device E1 from the second wireless communication module 136. The control signals of the second operation interface 131 are directly transmitted to the mobile device E1 through the second wireless communication module 136.

In addition, a third configuration, the first handheld body 11 includes a first wireless communication module 116, and the second handheld body 13 includes a second wireless communication module 136. The first wireless communication module 116 is electrically connected to the first operation interface 111, and the second wireless communication module 136 is electrically connected to the second operation interface 131. In other words, the first handheld body 11 and the second handheld body 13 include a wireless communication module, respectively.

The first wireless communication module 116 and the second wireless communication module 136 are communicatively connected to the mobile device E1, respectively. It is not necessary for the first wireless communication module 116 and the second wireless communication module 136 to be communicatively connected to each other. The plurality of the control signals of the first operation interface 111, and the setting values of the first handheld body 11 are directly transmitted to the mobile device E1 through the first wireless communication module 116. The plurality of the control signals of the second operation interface 131, and the setting values of the second handheld body 13 are directly transmitted to the mobile device E1 through the second wireless communication module 136. In other words, the first handheld body 11 and the second handheld body 13 are communicatively connected to the mobile device E1 through the first wireless communication module 116 and the second wireless communication module 136, respectively.

Referring to FIG. 8, the mobile device E3 in FIG. 8 is relatively large in size. Therefore, the first handheld body 11 and the second handheld body 13 can be respectively disposed on both sides of the mobile device E3 by the first support unit 12 and the second support unit 14 to support the mobile device E3.

Furthermore, the structure and shape of the first support unit 12 and the second support unit 14 can be adjusted based on actual requirements. The sizes of the first support unit 12 and the second support unit 14 can be respectively adjusted in a telescopic manner or in a foldable manner. In other words, each of the first support unit 12 and the second support unit 14 may have a telescopic structure or a foldable structure to extend the size thereof.

Third Embodiment

Figure 9:
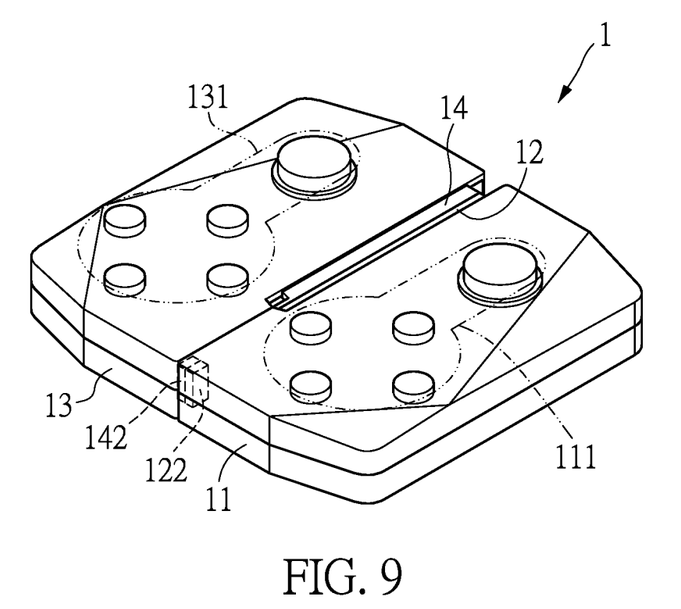
FIG. 9 is a schematic view of a game controller of a third embodiment of the present disclosure.

Referring to FIG. 9, FIG. 9 is a schematic view of a third embodiment of the present disclosure.

As shown in FIG. 9, when the first support unit 12 and the second support unit 14 are respectively in a folded state, the first handheld body 11 is electrically connected to the second handheld body 12 through a third supporting connection portion 122 of the first support unit 12 and a fourth supporting connection portion 142 of the second support unit 14. In other words, in the present embodiment, when the first support unit 12 and the second support unit 14 are in a folded state, the third supporting connection portion 122 of the first support unit 12 is connected to the fourth supporting connection portion 142 of the second support unit 14.

In the present embodiment, the third supporting connection portion 122 and the fourth supporting connection portion 142 can be connected in a magnetic manner or in a mechanic fixing manner. The first handheld body 11 is connected to the second handheld body 13 through the first support unit 12 in a folded state and the second support unit 14 in a folded state. The first handheld body 11 and the second handheld body 12 are communicatively connected to the mobile device E1, E3 through the first wireless communication module 116 and the second wireless communication module 136 to transmit the control signals. In addition, the first handheld body 11 and the second handheld body 13 can also be connected to the mobile device or other electronic device (a game host or desktop computer) through a combined connector (not shown) and a transmission cable to transmit the control signals.

In addition, when only the first handheld body 11 includes the battery unit, and the first support unit 12 and the second support unit 14 are in a folded state, the first handheld body 11 provides the electric power to the second handheld body 13 through the third supporting connection portion 122 and the fourth supporting connection portion 142.

Both of the first handheld body 11 and the second handheld body 13 can include the battery units. In other words, the first handheld body 11 includes a first battery unit 115, and the second handheld body 13 includes a second battery unit 135. In addition, the first battery unit 115 is electrically connected to the first operation interface 111. The second battery unit 135 is electrically connected to the second operation interface 131.

When the first support unit 12 and the second support unit 14 are in a folded state, respectively, the first handheld body 11 provides the electric power to the second handheld body 13 through the third supporting connection portion 122 and the fourth supporting connection portion 142, or the second handheld body 13 provides the electric power to the first handheld body 11 through the third supporting connection portion 122 and the fourth supporting connection portion 142. In other words, the first handheld body 11 and the second handheld body 13 can transmit the electric power to each other.

In conclusion, the game controller of the present disclosure can use a single-sided handheld body or two handheld bodies at the same time to jointly support the mobile device. The game controller of the present disclosure is not only convenient to carry and easier to use, but also includes a support unit to support the mobile device. Furthermore, the game controller of the present disclosure can use the two handheld bodies after being combined, which further improves the user experience in selecting games to play or making use of other control actions.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A game controller, comprising:
a first handheld body including a first operation interface and a first connection portion, the first operation interface being electrically connected to the first connection portion;
a first support unit pivotally connected to a side of the first handheld body, the first support unit being foldably disposed on a side of the first handheld body;
a second handheld body including a second operation interface; and
a second support unit being pivotally connected to one side of the second handheld body, and being foldably disposed on one side of the second handheld body;
wherein, when the first support unit and the second support unit are in an unfolded state, the mobile device is fixedly disposed between the first handheld body, the first support unit, the second handheld body, and the second support unit, the first handheld body includes a processor and a first battery unit, the first support unit includes a first supporting connection portion, the second support unit includes a second supporting connection portion, the processor is electrically connected to the first battery unit and the first supporting connection portion, the first operation interface is electrically connected to the first supporting connection portion, the second operation interface is electrically connected to the second supporting connection portion, and when the mobile device is fixedly disposed between the first handheld body, the first support unit, the second handheld body, and the second support unit, the first handheld body is electrically connected to the second handheld body through the first supporting connection portion and the second supporting connection portion.

2. The game controller of claim 1, wherein when the mobile device is fixedly disposed between the first support unit, the first handheld body, the mobile device is connected to the first connection portion of the first handheld body.

3. The game controller of claim 1, wherein the first handheld body further includes a first wireless communication module, the first wireless communication module is electrically connected to the first operation interface, and the first wireless communication module is communicatively connected with a mobile communication module of the mobile device.

4. The game controller of claim 1, wherein the mobile device is electrically connected to the first handheld body through the first connection portion.

5. The game controller of claim 4, wherein the first connection portion is fixedly disposed on the first handheld body.

6. The game controller of claim 5, wherein the first connection portion is a lightning connector, a micro USB connector, a type-A USB connector, or a type-C USB connector.

7. The game controller of claim 4, wherein the first connection portion is detachably disposed on the first handheld body.

8. The game controller of claim 7, wherein the first connection portion is replaceable, and the first connection portion is a lightning connector, a micro USB connector, a type-A USB connector, or a type-C USB connector.

9. The game controller of claim 1, wherein the first handheld body or the second handheld body includes a wireless communication module, the wireless communication module of the first handheld body or the second handheld body is communicatively connected to the mobile device, the first handheld body and the second handheld body are communicatively connected in a wired manner, and the first handheld body is connected to the second handheld body through the first supporting connection portion of the first support unit and the second supporting connection portion of the second support unit.

10. The game controller of claim 1, wherein the first handheld body includes a first wireless communication module, and the second handheld body includes a second wireless communication module, and wherein the first wireless communication module is electrically connected to the first operation interface, and the second wireless communication module is electrically connected to the second operation interface.

11. The game controller of claim 10, wherein the first wireless communication module is communicatively connected to the second wireless communication module, and the first wireless communication module is communicatively connected to the mobile device, and wherein a plurality of control signals of the first operation interface of the first handheld body are transmitted to the mobile device through the first wireless communication module, a plurality of control signals of the second operation interface of the second handheld body are transmitted to the first wireless communication module through the second wireless communication module, and then the control signals of the second operation interface of the second handheld body are transmitted to the mobile device through the first wireless communication module.

12. The game controller of claim 10, wherein the first wireless communication module is communicatively connected to the mobile device, and the second wireless communication module is communicatively connected to the mobile device, and wherein a plurality of control signals of the first operation interface are transmitted to the mobile device through the first wireless communication module, and a plurality of control signals of the second operation interface are transmitted to the mobile device thorough the second wireless communication module.

13. The game controller of claim 1, wherein the first support unit and the second support unit each has a telescopic structure or a folding structure to adjust sizes of the first support unit and the second support unit.

14. The game controller of claim 1, wherein when the first support unit and the second support unit are each in a folded state, the first handheld body is electrically connected to the second handheld body through a third supporting connection portion of the first support unit and a fourth supporting connection portion of the second support unit.

15. The game controller of claim 14, wherein when the first support unit and the second support unit are each in a folded state, the first handheld body provides an electric power to the second handheld body through the third supporting connection portion and the fourth supporting connection portion.

16. The game controller of claim 14, wherein the second handheld body further includes a second battery unit, and the second battery unit is electrically connected to the second operation interface, and wherein when the first support unit and the second support unit are respectively in a folded state, the first handheld body provides an electric power to the second handheld body through the third supporting connection portion and the fourth supporting connection portion, or the second handheld body provides an electric power to the first handheld body through the third supporting connection portion and the fourth supporting connection portion.

* * * * *